(12) United States Patent
Inoue

(10) Patent No.: US 7,261,457 B2
(45) Date of Patent: Aug. 28, 2007

(54) SURFACE LIGHT SOURCE DEVICE

(75) Inventor: Kaoru Inoue, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/299,905

(22) Filed: Dec. 13, 2005

(65) Prior Publication Data

US 2006/0092661 A1 May 4, 2006

Related U.S. Application Data

(63) Continuation of application No. PCT/JP04/08569, filed on Jun. 11, 2004.

(30) Foreign Application Priority Data

Jun. 13, 2003 (JP) .............................. 2003-169915

(51) Int. Cl.
*F21V 7/04* (2006.01)
*G02F 1/1335* (2006.01)

(52) U.S. Cl. ...................... 362/609; 362/634; 362/632; 362/606; 362/608; 349/67

(58) Field of Classification Search ................ 362/606, 362/632–634, 609, 608, 610; 349/67
See application file for complete search history.

(56) References Cited

U.S. PATENT DOCUMENTS 5,788,356 A * 8/1998 Watai et al. ................ 362/621
6,309,081 B1 * 10/2001 Furihata ..................... 362/634
6,435,685 B2 * 8/2002 Matsushita .................. 362/608
6,742,906 B2 * 6/2004 Matsushita .................. 362/615
6,979,115 B2 * 12/2005 Ohizumi et al. ............ 362/634
7,188,990 B2 * 3/2007 Morito ....................... 362/634

FOREIGN PATENT DOCUMENTS

| JP | 2001-6419 | 1/2001 |
|---|---|---|
| JP | 2001-332116 | 11/2001 |
| JP | 2002-270024 | 9/2002 |
| JP | 2003-22705 | 1/2003 |

* cited by examiner

*Primary Examiner*—John Anthony Ward
*Assistant Examiner*—David Makiya
(74) *Attorney, Agent, or Firm*—Oblon, Spivak, Maier & Neustadt, P.C.

(57) ABSTRACT

A surface light source conversion member, which converts emission light from a light source to planar light, has a predetermined thickness at a part thereof where a light incidence surface of a light guide, which is opposed to the light source, is located. A reflector, which reflects emission light from the light source toward the light incidence surface, includes a clamp portion that clamps the surface light source conversion member in a thickness direction thereof. The clamp portion contacts a corner portion that is formed between a light emission surface of the light guide and the light incidence surface of the light guide and is separated from the light emission surface. The reflector creates a gap, which is smaller than a predetermined thickness, between the light source and the light incidence surface.

6 Claims, 4 Drawing Sheets

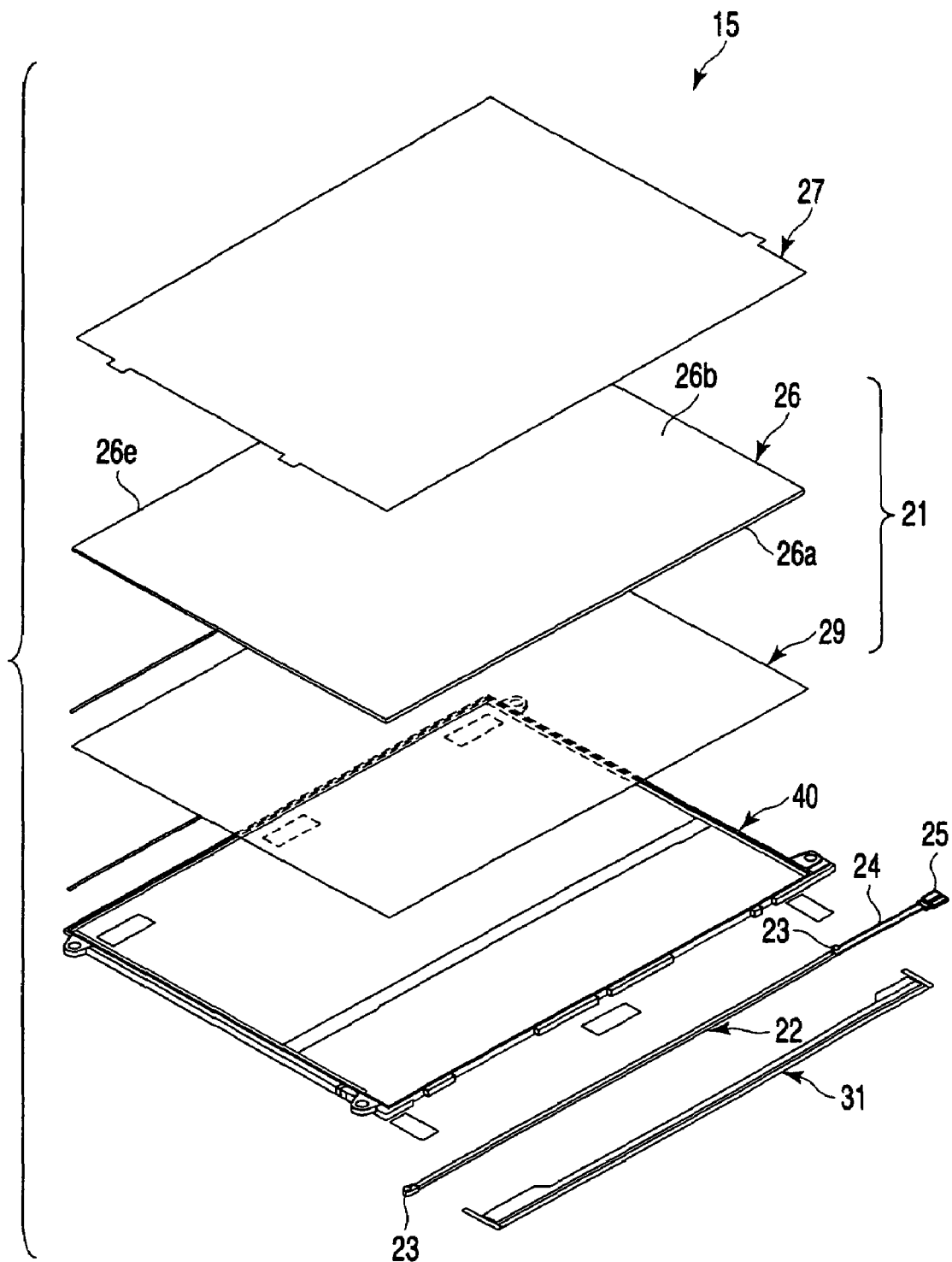
F I G. 2

SURFACE LIGHT SOURCE DEVICE

CROSS REFERENCE TO RELATED APPLICATIONS

This is a Continuation Application of PCT Application No. PCT/JP2004/008569, filed Jun. 11, 2004, which was published under PCT Article 21(2) in Japanese.

This application is based upon and claims the benefit of priority from prior Japanese Patent Application No. 2003-169915, filed Jun. 13, 2003, the entire contents of which are incorporated herein by reference.

BACKGROUND OF THE INVENTION

1. Field of the Invention

The present invention relates to a surface light source device that converts linear emission light, which is emitted from a light source, to planar emission light.

2. Description of the Related Art

A prior-art surface light source device includes a cold-cathode fluorescent lamp that is a discharge lamp serving as an elongated cylindrical linear light source that emits linear light. The cold-cathode fluorescent lamp is surrounded by a sheet-like lamp reflector that serves as a reflecting member. The lamp reflector has an opening portion, through which emission light from the cold-cathode fluorescent lamp is taken out. The opening portion of the lamp reflector is fitted on the side surface of a light guide that converts linear light from the cold-cathode fluorescent lamp to planar light and emits the planar light from the surface thereof. Prisms are formed on the back surface of the light guide.

In this surface light source device, emission light from the cold-cathode fluorescent lamp is reflected by the lamp reflector and is guided to the side surface of the light guide through the opening portion. The light that is guided to the light guide is emitted from the surface of the light guide. The emission light from the surface of the light guide is collected or diffused by an optical sheet that is disposed on the front surface of the light guide. Part of the light that is guided to the light guide emerges from the back surface of the light guide. The emission light from the back surface of the light guide is reflected by an optical sheet, which is disposed on back surface of the light guide, toward the light guide side (see, e.g. Jpn. Pat. Appln. KOKAI Publication No. 2002-270024).

In recent years, there has been a demand for still higher luminance, a further reduction in thickness and weight and a further reduction in cost in the liquid crystal display that includes this type of surface light source device. Hence, still higher luminance, a further reduction in thickness and weight and a further reduction in cost are required in the surface light source device. The provision of the prisms on the back surface of the light guide is an effective measure for meeting the above demand, since the light collecting function is improved and the number of optical sheets can be reduced.

However, in the prior-art surface light source device, a slight gap may possibly occur between the lamp reflector and the light guide due to non-uniformity in shape of the lamp reflector or non-uniformity in assembly of the lamp reflector and light guide. As a result, emission light from the cold-cathode fluorescent lamp may enter the light guide from a surface thereof, which is other than the side surface thereof. To be more specific, emission light from the cold-cathode fluorescent lamp may leak from the gap between the lamp reflector and light guide and may enter the light guide from the front surface thereof. The light, which is incident on the light guide from the surface, other than the side surface, of the light guide, may cause dark-luminance lines or luminance non-uniformity on the front surface of the light guide. In addition, when the light guide that is provided with the prisms on the back surface thereof is employed, it is more likely that, by the light collecting function of the prisms, luminance non-uniformity may occur due to the light that enters the light guide from the surface, other than the side surface, of the light guide.

In short, in the prior-art surface light source device, there is the problem that an improvement in quality of in-plane luminance is not easy.

BRIEF SUMMARY OF THE INVENTION

The present invention has been made in consideration of the above problems, and the object of the invention is to provide a surface light source device that can enhance the quality of in-plane luminance.

According to an embodiment of the present invention, there is provided a surface light source device comprising: a light source; a surface light source conversion member that converts emission light from the light source to planar light and emits the planar light; a light guide that is included in the surface light source conversion member, includes a first major surface and a second major surface that are opposed to each other, includes a side surface that connects the first major surface and the second major surface, and is disposed such that the side surface is opposed to the light source; and a reflector that reflects emission light from the light source toward the side surface, wherein the surface light source conversion member has a predetermined thickness at a part thereof where the side surface is located, the reflector includes a pair of clamp portions that clamp the surface light source conversion member in a thickness direction thereof and are opposed to each other, wherein at least one of the clamp portions contacts a corner portion that is formed between the first major surface and the side surface of the light guide and is separated from the first major surface, and wherein the reflector creates a gap that is smaller than the predetermined thickness between the light source and the side surface.

According to this surface light source device, the reflector has clamp portions that clamp the surface light source conversion member such that emission light from the light source may not enter the light guide from a surface thereof, other than the side surface thereof, the light guide being included in the surface light source conversion member. This prevents the occurrence of non-uniformity in luminance due to emission light that enters the light guide from a surface thereof, other than the side surface thereof. Thus, in-plane luminance can be made uniform, and the quality of in-plane luminance can be improved.

The reflector creates a gap between the light source and the side surface. The gap is smaller than a predetermined thickness. Thus, movement of the area light source conversion member toward the light source side can be prevented, and the light source is protected from damage due to contact with the surface light source conversion member.

BRIEF DESCRIPTION OF THE SEVERAL VIEWS OF THE DRAWING

FIG. 2 is an exploded perspective view that schematically shows the structure of the surface light source device shown in FIG. 1;

DETAILED DESCRIPTION OF THE INVENTION

A surface light source device according to an embodiment of the present invention will now be described with reference to the accompanying drawings.

Figure 3:
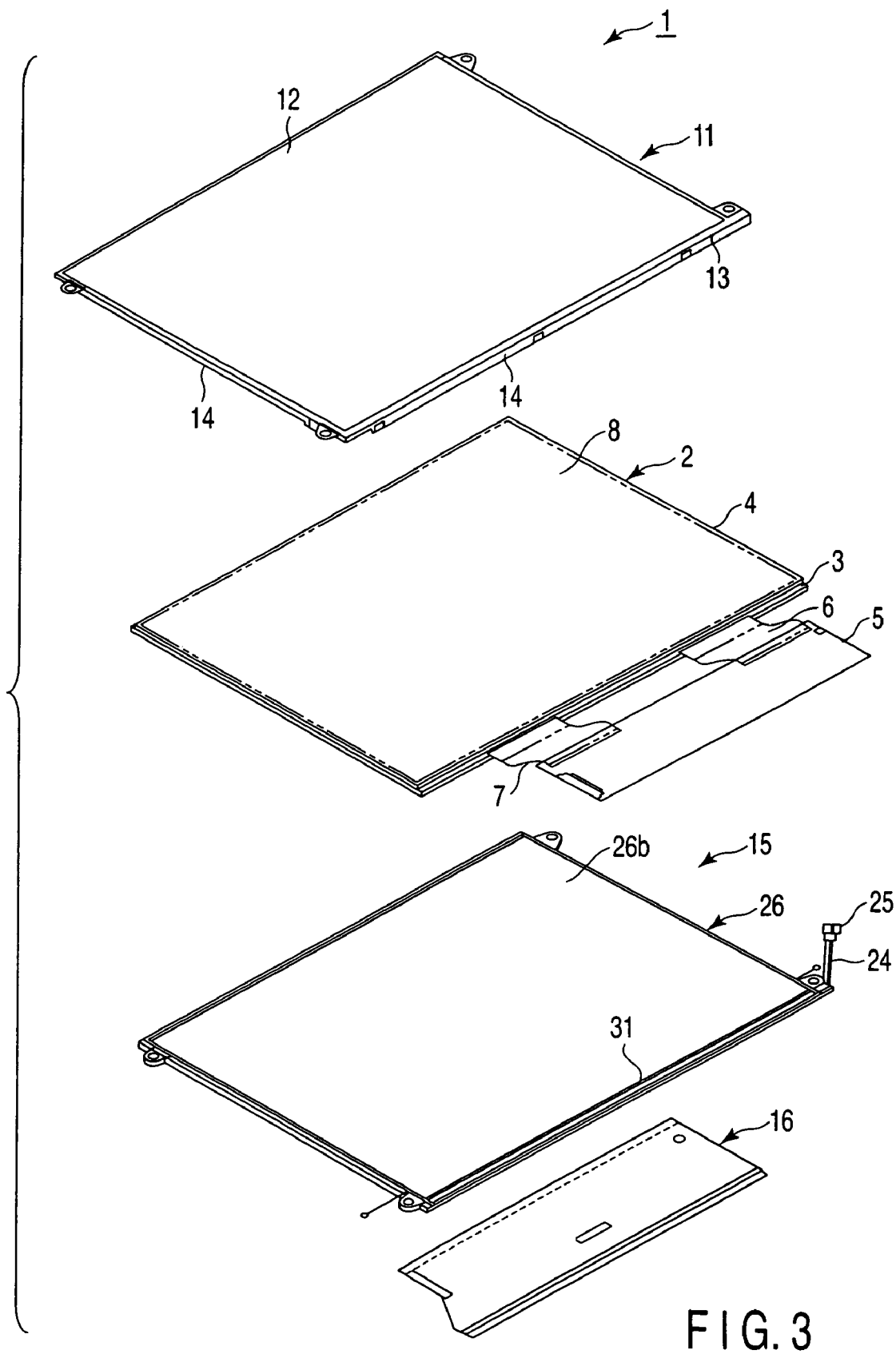
FIG. 3 is an exploded perspective view that schematically shows the structure of a liquid crystal display apparatus that includes the surface light source device shown in FIG. 1.

FIG. 3 shows a transmissive liquid crystal display apparatus 1 serving as a flat display apparatus, which has such a thin structure that a picture-frame-like peripheral portion is narrow and good portability is obtained. The liquid crystal display apparatus 1 includes a substantially rectangular, planar liquid crystal display panel 2 that serves as a transmissive flat display panel, which is typically used as an image display unit of a notebook personal computer (PC).

The liquid crystal display panel 2 is configured such that a liquid crystal layer that serves as an optical modulation layer is interposed between a pair of substrates, that is, an array substrate 3 and a counter substrate 4. The array substrate 3 includes thin-film transistors (TFTs) that are arranged in a matrix on the surface thereof, and pixel electrodes that are connected to the thin-film transistors. The counter substrate 4 includes a counter-electrode. The pixel electrodes and counter-electrode are formed of an electrically conductive material with light transmissivity. The array substrate 3 and counter substrate 4 are disposed such that the pixel electrodes are opposed to the counter-electrode, and a gap is created between the array substrate 3 and the counter substrate 4. The liquid crystal layer is formed of a liquid crystal composition that is sealed in the gap between the array substrate 3 and counter substrate 4.

An elongated rectangular, planar driver circuit 5, which serves as a circuit board for supplying a drive signal to the liquid crystal display panel 2 and driving the liquid crystal display panel 2, is attached to one side edge of the liquid crystal display panel 2 via a pair of flexible print circuits (FPCs) 6 and 7.

The liquid crystal display panel 2 has a rectangular display screen area 8 on a central part thereof, which corresponds to a display area for displaying an image. The diagonal size of the display screen area 8 is, e.g. 12 inches.

The liquid crystal display panel 2 is disposed between a bezel cover 11 and a backlight 15 that functions as a surface light source device. Specifically, the bezel cover 11, which has a rectangular frame-like shape, is attached to a front surface (i.e. a first major surface) of the liquid crystal display panel 2. The bezel cover 11 includes a rectangular window part 12, which exposes the display screen area 8 of the liquid crystal display panel 2, and a rectangular frame-shaped main body part 13 that defines the window part 12. The main body part 13 includes an outer peripheral portion 14 that covers an outer edge part of the liquid crystal display panel 2 when the liquid crystal display panel 2 is accommodated.

The rectangular, planar backlight 15 is attached so as to face the back surface of the liquid crystal display panel 2. The backlight 15 emits planar light toward the back surface of the display screen area 8 of the liquid crystal display panel 2. The backlight 15, together with the liquid crystal display panel 2, is accommodated in the bezel cover 11 such that the front surface of the backlight 15 is opposed to the back surface of the liquid crystal display panel 2.

The driver circuit 5 that is attached to the liquid crystal display panel 2 is disposed on the back side of the backlight 15 by bending the print circuits 6 and 7 toward the back side of the backlight 15. In this case, an elongated rectangular insulation sheet 16 is interposed between the driver circuit 5 and the backlight 15. The insulation sheet 16 secures insulation between the driver circuit 5 and backlight 15.

Figure 1:
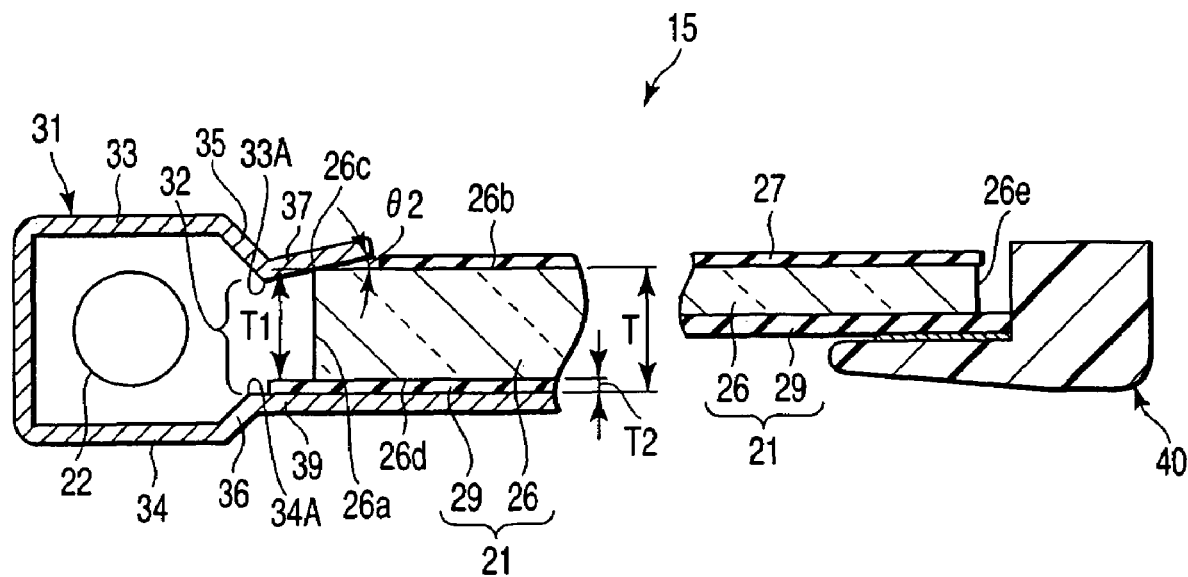
FIG. 1 is a side view that schematically shows the structure of a surface light source device according to an embodiment of the present invention.

The backlight 15, as shown in FIG. 1 and FIG. 2, includes a cold-cathode fluorescent lamp 22 serving as a discharge lamp that is an elongated cylindrical linear light source. Both end portions of the cold-cathode fluorescent lamp 22 are engaged with lamp holders 23. The lamp holders 23 are formed of, e.g. elastic rubber. Two cables 24 are connected at one end to both ends of the cold-cathode fluorescent lamp 22. The cables 24 are attached at the other end to a housing 25 that serves as a connector.

The backlight 15 includes a surface light source conversion member 21 that converts emission light from the cold-cathode fluorescent lamp 22 to planar light and emits the planar light. The surface light source conversion member 21 includes a substantially rectangular, planar light guide 26. The light guide 26 has a first major surface 26b and a second major surface 26d, which are opposed to each other, and a first side surface 26a and a second side surface 26e, which connect the first major surface 26b and second major surface 26d. The light guide 26 is disposed in the state in which the first side surface 26a is opposed to the outer peripheral surface of the cold-cathode fluorescent lamp 22 in parallel with the cold-cathode fluorescent lamp 22 and in the state in which the first major surface 26b is opposed to the back surface of the liquid crystal display panel 2. In short, the first side surface 26a is a light incidence surface on which emission light from the cold-cathode fluorescent lamp 22 is incident. The first major surface 26b is a light emission surface that emits planar light toward the liquid crystal display panel 2. The light incidence surface 26a corresponds to a planar part that does not include a corner portion 26c defined between the light incidence surface 26a and light emission surface 26b.

Figure 5:
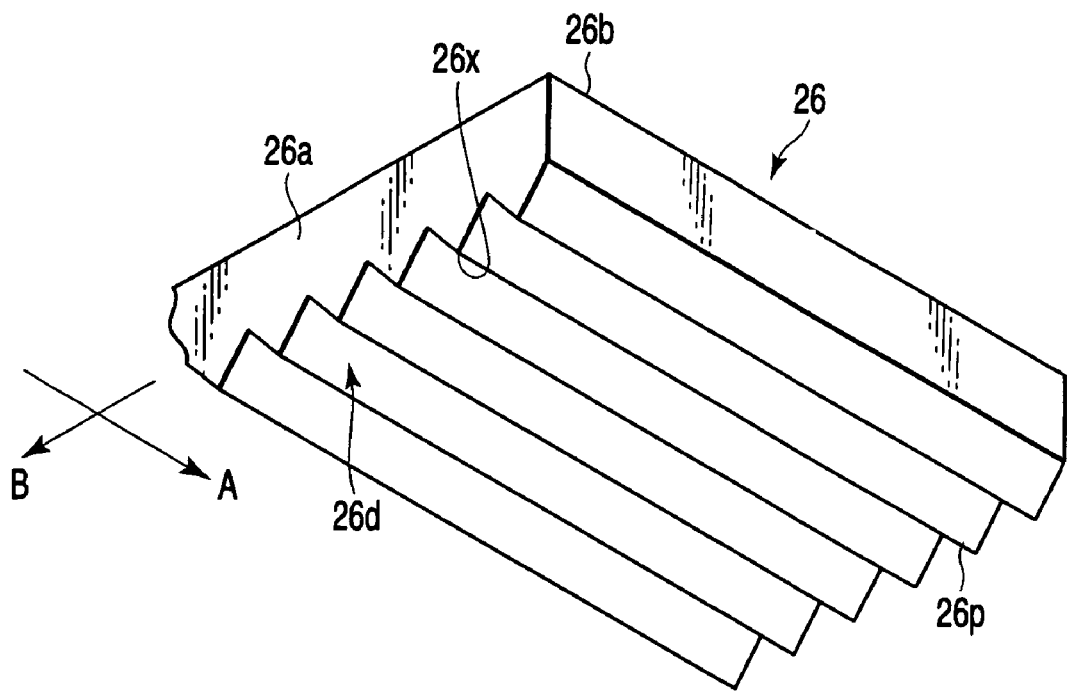
FIG. 5 is a perspective view that shows the shape of a light guide that is a structural element of the surface light source device shown in FIG. 1.
Figure 6:
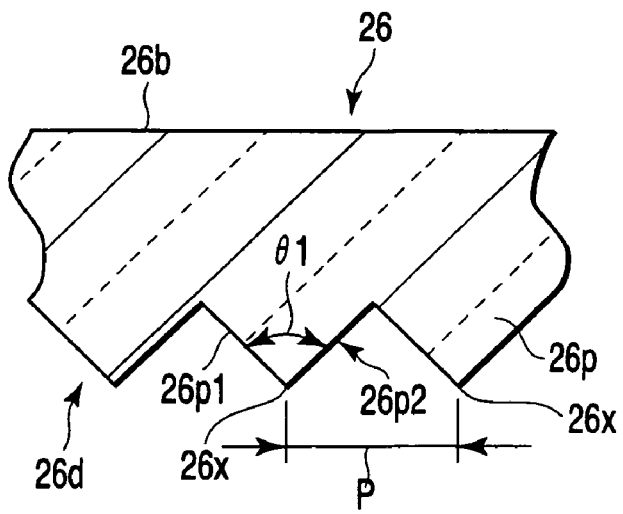
FIG. 6 is a cross-sectional view that shows the shape of the light guide of the surface light source device shown in FIG. 1.

The light guide 26 is a prism waveguide that is configured such that prisms each with a light collecting function are formed on at least one of the major surfaces of the prism waveguide. In this embodiment, as shown in FIG. 5 and FIG. 6, the light guide 26 has prisms 26p on its second major surface 26d. Each prism 26p extends in a normal direction A of the first side surface 26a and has an apex corner 26x along the normal direction A. The apex corner 26x corresponds to an intersection between two surfaces 26p1 and 26p2 of the prism 26p. In this embodiment, the angle θ1 between the surfaces 26p1 and 26p2 is about 90°. The prisms 26p are arranged in a direction B that is perpendicular to the normal direction A. In the embodiment, the pitch P between adjacent prisms 26p is about 50 μm.

The light guide 26 converts a linear light source to a planar light source. To be more specific, the light guide 26 deflects linear emission light from the cold-cathode fluorescent lamp 22, which is incident on the light incidence surface 26a, toward the first major surface 26b (or totally reflects the linear emission light by the second major surface 26d) and converts the linear emission light to planar emission light. In short, the light guide 26 emits planar light from the first major surface 26b.

The light guide 26 is formed of, e.g. light-transmissive resin. The light guide 26 is formed in such a wedge shape that the thickness of the light guide 26 gradually decreases from the light incidence surface 26a toward the second side surface (non-light incidence surface) 26e. The thickness of the light guide 26, in this context, corresponds to the height in the normal direction of the first major surface 26b. With this shape, the incident light on the light incidence surface 26a of the light guide 26 is equally reflected toward the first major surface 26b, and a space for accommodating the driver circuit 5 is provided on the second major surface 26d side, which is located on the non-light incidence surface 26e side of the light guide 26. In this embodiment, the thickness T1 of the light guide 26 on the light incidence surface 26a side is 2.5 mm.

The substantially rectangular optical sheet 27 is attached so as to cover the first major surface 26b of the light guide 26. The optical sheet 27 is at least one of a light collecting sheet that collects planar emission light from the first major surface 26b of the light guide 26, and a diffusion sheet that diffuses planar emission light from the first major surface 26b of the light guide 26.

The substantially rectangular optical sheet 29 is attached so as to cover the second major surface 26d of the light guide 26. The optical sheet 29 is a reflective sheet that reflects light, which leaks out from the inside of the light guide 26 through the second major surface 26d, toward the first major surface 26b of the light guide 26.

The optical sheet 29 has a substantially rectangular shape with a size greater than the size of the second major surface 26d of the light guide 26. The optical sheet 29 extends to the light incidence surface 26a side of the light guide 26 and forms the surface light source conversion member 21. The thickness T2 of the optical sheet 29 is, e.g. 0.16 mm. Accordingly, in the region where the light incidence surface 26a of the light guide 26 is located, the surface light source conversion member 21 has a predetermined thickness that corresponds to the sum T of the thickness T1 of the light guide 26 on the light incidence surface 26a side and the thickness T2 of the optical sheet 29. In this embodiment, the thickness T is 2.66 mm.

The backlight 15 further includes a sheet-like lamp reflector 31 that serves as a reflector for reflecting emission light from the cold-cathode fluorescent lamp 22 toward the light incidence surface 26a of the light guide 26. The lamp reflector 31, as shown in FIG. 1, has a substantially C-shaped cross section. The lamp reflector 31 is so disposed as to surround the cold-cathode fluorescent lamp 22 that is opposed to the light incidence surface 26a of the light guide 26. To be more specific, the lamp reflector 31 includes a first extension portion 33 that extends toward the light incidence surface 26a of the light guide 26, and a second extension portion 34 that extends toward the second major surface 26d. The first extension portion 33 and second extension portion 34 surround the cold-cathode fluorescent lamp 22.

A mid-portion 35 of the first extension portion 33 is bent toward the cold-cathode fluorescent lamp 22, and a distal end portion 37 of the first extension portion 33 is bent away from the cold-cathode fluorescent lamp 22. Similarly, a mid-portion 36 of the second extension portion 34 is bent toward the cold-cathode fluorescent lamp 22, and a distal end portion 39 of the second extension portion 34 is bent away from the cold-cathode fluorescent lamp 22.

The lamp reflector 31 forms an opening portion 32 for letting out emission light from the cold-cathode fluorescent lamp 22. The opening portion 32 is opposed to the light incidence surface 26a of the light guide 26. The opening portion 32, as shown in FIG. 1 and FIG. 4, is defined by a bent portion 33A, which is formed between the mid-portion 35 and distal end portion 37 of the first extension portion 33, and a bent portion 34A, which is formed between the mid-portion 36 and distal end portion 39 of the second extension portion 34.

The distal end portion 37 of the first extension portion 33 and the distal end portion 39 of the second extension portion 34 function as a pair of clamp portions that are opposed to each other and clamp the surface light source conversion member 21 in its thickness direction. At least one of the distal end portions 37 and 39 is configured to be put in contact with a corner portion between one major surface and the light incidence surface of the light guide 26 and to be separated from the said one major surface of the light guide 26.

Figure 4:
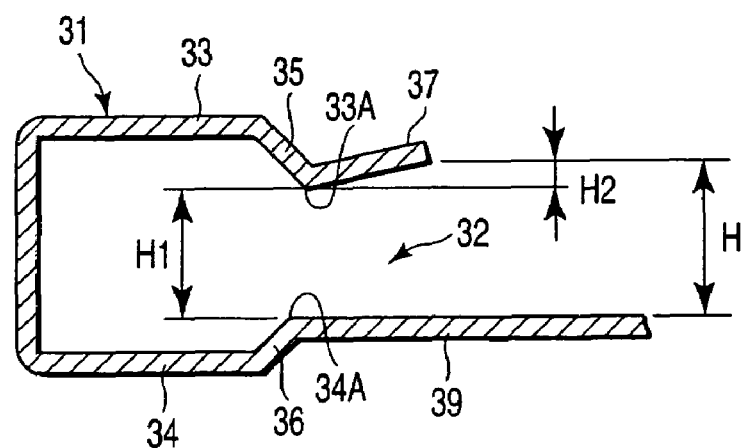
FIG. 4 is a side view that shows the shape of a reflector that is a structural element of the surface light source device shown in FIG. 1.

Specifically, as shown in FIG. 4, the pair distal end portions 37 and 39 are configured to define such a taper shape that the gap therebetween gradually decreases from the surface light source conversion member 21 toward the cold-cathode fluorescent lamp 22.

In this embodiment, the distal end portion 37 is inclined, relative to the first major surface 26b of the light guide 26, and is put in contact with the light guide 26. The distal end portion 39 is substantially parallel to the second major surface 26d of the light guide 26. The optical sheet 29 is interposed between the light guide 26 and the distal end portion 39, and the distal end portion 39 is not put in contact with the light guide 26.

In this embodiment, the distal end portion 37 is in contact with the corner portion 26c that is formed between the first major surface 26b of the light incidence surface 26a of the light guide 26. In addition, the distal end portion 37 is separated from the first major surface 26b. In other words, the distal end portion 37 and distal end portion 39 integrally clamp the light guide 26 and optical sheet 29 in the state in which the distal end portion 37 is in contact with the light guide 26 only at the corner portion 26c and not in contact with the first major surface 26b or light incidence surface 26a of the light guide 26.

The lamp reflector 31 has spring properties and is slightly resiliently deformable in the thickness direction of the surface light source conversion member 21. Accordingly, the gap between the first extension portion 33 and second extension portion 34 is slightly variable.

In this embodiment, in the state in which the area light source conversion member 21 is not clamped between the first extension portion 33 and second extension portion 34, the minimum gap between the first extension portion 33 and second extension portion 34, that is, the gap H1 of the opening portion 32 between the bent portion 33A and bent portion 34A, is, e.g. 2.4 mm±0.1 mm. In addition, the height between the distal end portion 37 and the bent portion 33A, that is, the dimension H2 of inclination of the distal end portion 37, is, e.g. 0.2 mm.

Thus, the thickness T of the surface light source conversion member that is clamped between the paired distal end portions 37 and 39 (the sum of the thickness Ti of the light guide 26 on the light incidence surface 26a side and the thickness T2 of the optical sheet 29) is greater than the gap H1 between the bent portion 33A and bent portion 34A. That is, H1<T. In addition, the thickness T of the surface light source conversion member that is clamped between the paired distal end portions 37 and 39 is greater than the sum H of the gap H1 and the dimension H2 of inclination of the distal end portion 37. That is, H<T.

When the light guide 26, to which the optical sheet 29 is attached, is pushed in the opening portion 32 of the lamp reflector 31, the paired distal end portions 37 and 39 are moved away from each other. On the other hand, the paired distal end portions 37 and 39 are urged toward each other and clamp the surface light source conversion member 21. Thereby, the distal end portion 37 is put in contact with only the corner portion 26c that is formed between the light incidence surface 26a and first major surface 26b of the light guide 26, while the distal end portion 37 is put in contact with only the optical sheet 29. As a result, the distal end portion 37 isolates the light incidence surface 26a and first major surface 26b of the light guide 26 from each other, thus preventing emission light from the cold-cathode fluorescent lamp 22 from entering a surface, other than the light incidence surface 26a, of the light guide 26.

In addition, when the surface light source conversion member 21 is clamped between the paired distal end portions 37 and 39, the lamp reflector 31 creates a gap, which is smaller than the thickness T of the surface light source conversion member 21, between the cold-cathode fluorescent lamp 22 and the light incidence surface 26a of the light guide 26. Thus, movement of the surface light source conversion member 21, in particular, of the light guide 26, toward the cold-cathode fluorescent lamp 22 is suppressed, and damage to the cold-cathode fluorescent lamp 22 due to contact with the surface light source conversion member 21 is prevented.

The optical sheet 27, such as a light collecting sheet or a light diffusion sheet, is attached to the first major surface 26b of the light guide 26. The optical sheet (reflective sheet) 29 is attached to the second major surface 26d of the light guide 26. The cold-cathode fluorescent lamp 22 and lamp reflector 31 are attached on the light incidence surface 26a side of the light guide 26. The light guide 26, which is thus assembled, is held in the substantially rectangular, planar frame 40.

Next, the operation of the above-described embodiment is described.

To begin with, electric energy is supplied to the cold-cathode fluorescent lamp 22 via the housing 25 and cables 24, thereby driving the cold-cathode fluorescent lamp 22.

Linear emission light from the cold-cathode fluorescent lamp 22 is reflected by the inner surface of the lamp reflector 31 that covers the cold-cathode fluorescent lamp 22. The reflected light is made incident on the light incidence surface 26a of the light guide 26. At this time, the distal end portion 37 of the lamp reflector 31 prevents the emission light from the cold-cathode fluorescent lamp 22 from entering the light guide 26 through a surface other than the light incidence surface 26a.

The incident light on the light incidence surface 26a of the light guide 26 is refracted or reflected toward the first major surface 26b of the light guide 26 by the prisms that are formed on the second major surface 26d of the light guide 26 and by the optical sheet 29 attached to the second major surface 26d. Thereby, planar emission light emerges from the first major surface 26b of the light guide 26.

The planar emission light from the first major surface 26b of the light guide 26 is given predetermined optical characteristics while it is passing through the optical sheet 27. For example, the emission light is properly collected or properly diffused. Thereby, the luminance of the planar emission light from the first major surface 26b of the light guide 26 is improved and made uniform.

The illumination light from the backlight 15, that is, planar light from the optical sheet 27, is made incident on the back surface of the liquid crystal display panel 2. The incident illumination light on the liquid crystal display panel 2 selectively passes through the display screen area 8 of the liquid crystal display panel 2. Thereby, an image is displayed on the display screen area 8 of the liquid crystal display panel 2.

As has been described above, the distal end portion 37 of the lamp reflector 31 is configured to contact the corner portion 26c, without contacting the light incidence surface 26a or first major surface 26b of the light guide 26. Thus, the light incidence surface 26a and first major surface 26b of the light guide 26 are isolated from each other.

In the prior-art surface light source device, a gap may possibly occurs between the opening portion 32 of the lamp reflector 31 and the first major surface 26b of the light guide 26 due to non-uniformity in shape of the lamp reflector 31, which occurs when the lamp reflector 31 is manufactured, or non-uniformity in assembly of the lamp reflector 31 and light guide 26. As a result, emission light from the cold-cathode fluorescent lamp 22 may leak through the gap and enter the first major surface 26b of the light guide 26. In particular, when the prism waveguide with the light collecting function is used as the light guide 26, non-uniformity in luminance tends to easily occur. Hence, there has been a demand for improvement in quality of in-plane luminance of the backlight.

To meet the demand, according to the above-described embodiment, even if non-uniformity occurs at the time of manufacture or assembly of the lamp reflector 31, the distal end portion 37 can prevent emission light from the cold-cathode fluorescent lamp 22 from entering the light guide 26 through a surface thereof, other than the light incidence surface 26a. Thus, non-uniformity in luminance of the light guide 26 can be prevented. Therefore, the luminance of the backlight 15 can be improved, the in-plane luminance can be made uniform, and the quality of luminance can be enhanced.

The thickness T of the surface light source conversion member 21 that is clamped between the paired distal end portions 37 and 39 of lamp reflector 31 is greater than the sum H of the gap H1 and the dimension H2 of inclination of the distal end portion 37. In addition, the lamp reflector 31 is configured to be slightly resiliently deformable in the thickness direction of the surface light source conversion member 21. Thus, if the surface light source conversion member 21 is pushed in from a direction perpendicular to the plane that includes the opening end face of the opening portion 32, the distal end portion 37 is slightly resiliently deformed in a direction away from the surface light source conversion member 21 and the gap between the paired distal end portions 37 and 39 is increased. Thereby, the entire corner portion 26c of the light guide 26 contacts the distal end portion 37 at a predetermined position. Even if the gap between the paired distal end portions 37 and 39 is increased, the gap does not become greater than the thickness of the surface light source conversion member 21. Therefore, the surface light source conversion member 21 (in particular, the light guide 26) can easily be positioned relative to the lamp reflector 31, the efficiency in manufacture can be enhanced, the movement of the surface light source conversion member 21 toward the cold-cathode fluorescent lamp 22 can be prevented, and the damage to the cold-cathode fluorescent lamp 22 can be prevented. The distal end portion 37 contacts the entirety of the corner portion 26c of the light guide 26 (at least the entirety of the corner portion 26c in the range facing the cold-cathode fluorescent lamp 22) without being affected by some non-uniformity of the lamp reflector 31 and light guide 26 at the time of manufacture and assembly. Hence, the light incidence surface 26a and first major surface 26b of the light guide 26 can surely be isolated from each other. Strictly speaking, the prisms 26p, which are formed on the second major surface 26d of the light guide 26, create gaps partly between the optical sheet 29 and the light guide 26 (at regions corresponding to the recesses of the prisms 26p). Such gaps, however, are very small. Similarly, in the case where a light guide 26, which has prisms on the first major surface 26b thereof, is used, gaps are created between the light guide 26 and the lamp reflector 31 at the regions of the recesses of the prisms. In this case, too, the gaps are very small and the advantageous effect of the present invention can fully be exhibited.

The distal end portion 37 of the lamp reflector 31 contacts only the light guide 26 and does not contact the first side surface 26a. In other words, the first side surface 26a is not covered at all by the lamp reflector 31, so emission light from the cold-cathode fluorescent lamp 22 can be made incident on the first side surface 26a. In short, the entire first side surface 26a can effectively be used as the light incidence surface 26a. Therefore, the emission light from the cold-cathode fluorescent lamp 22 can effectively be used, and the luminance can be enhanced.

The distal end portion 37 is inclined relative to the first major surface 26b of the light guide 26 in the state in which the surface light source conversion member 21 is clamped. At this time, the angle θ 2 between the distal end portion 37 and first major surface 26b should preferably be between 5° and 20°. If the angle θ 2 is less than 5°, the distal end portion 37 and the first major surface 26b become substantially parallel to each other, and the effect of preventing movement of the surface light source conversion member 21 toward the cold-cathode fluorescent lamp 22 is weakened when the surface light source conversion member 21 is pushed in between the paired distal end portions 37 and 39. If the angle θ 2 exceeds 20°, the force of clamping the surface light source conversion member 21 between the distal end portion 37 and distance end portion 39 is decreased, and the surface light source conversion member 21 may easily be disengaged toward the liquid crystal display panel 2 side. It is thus desirable that the angle θ 2 be within the above-mentioned range.

When the prism waveguide is used as the light guide 26, the effect of preventing non-uniformity in luminance can particularly be exhibited. Thus, there is no need to attach more than a necessary number of optical sheets, and the luminance of the backlight 15 can further be enhanced. Moreover, the quality of luminance can be improved. Besides, the thickness, weight and manufacturing cost of the backlight 15 can further be reduced.

According to the liquid crystal display apparatus 1 with the backlight 15, the luminance of the liquid crystal display apparatus 1 can be improved, the quality of luminance can be improved, and the thickness, weight and manufacturing cost can be reduced.

The present invention is not limited to the above-described embodiments. At the stage of practicing the invention, various modifications and alterations may be made without departing from the spirit of the invention. Structural elements disclosed in the embodiments may properly be combined, and various inventions can be made. For example, some structural elements may be omitted from the embodiments. Moreover, structural elements in different embodiments may properly be combined.

For example, in the above-described embodiment, the transmissive liquid crystal 1 has been described. However, the above-described surface light source device is applicable to the backlight of a trans-reflective liquid crystal display apparatus that includes a reflective part and a transmissive part. In addition, the above-described surface light source device is applicable to the front light of a reflective liquid crystal display apparatus that selectively reflects incident light, which is incident from the front surface side of the display screen area 8 of the liquid crystal display panel 2, and displays an image.

The optical sheet 29 does not necessarily extend to the light incidence surface 26a side of the light guide 26. In this case, only the light guide 26 of the surface light source conversion member 21 is clamped between the paired distal end portions 37 and 39. Needless to say, in this case, too, the same advantageous effect as with the above-described embodiment can be obtained by setting the thickness T (=T1) of the surface light source conversion member 21, which is clamped between the paired distal end portions 37 and 39, to be greater than the sum H of the gap H1 and the dimension H2 of inclination of the distal end portion 37.

As has been described above, the present invention can provide a surface light source device capable of improving the quality of in-plane luminance.

What is claimed is:

1. A surface light source device comprising:
   a light source;
   a surface light source conversion member that converts emission light from the light source to planar light and emits the planar light;
   a light guide that is included in the surface light source conversion member, which includes an emission and a bottom surface that are opposed to each other, includes a side surface that connects the emission surface and the bottom surface, and is disposed such that the side surface is opposed to the light source; and
   a reflector that reflects emission light from the light source toward the side surface,
   wherein the surface light source conversion member has a predetermined thickness at a part thereof where the side surface is located,
   the reflector includes a pair of clamp portions that clamp the surface light source conversion member in a thickness direction thereof and are opposed to each other and a bent portion which is provided between a middle portion of the reflector and one of the clamp portions and is bent inwardly,
   one of the clamp portions forms an inclined surface which is separated from the emission surface at an angle between 5° and 20°, the inclined surface being brought into contact with an end corner that is formed between the emission surface and the side surface of the light guide, and wherein
   the bent portion creates a gap that is smaller than the predetermined thickness.

2. The surface light source device according to claim 1, wherein the light guide has a prism on the bottom surface thereof.

3. The surface light source device according to claim 1, wherein the other of the clamp portions extends away from the light source in parallel with the light guide, and the pair of clamp portion are configured to define such a taper shape that a gap therebetween gradually decreases from the surface light source conversion member toward the light source conversion member toward the light source, thereby elastically clamping the light guide between the inclined surface of the one of the clamp portions and the other of the clamp portions.

4. The surface light source device according to claim 1, wherein a thickness $T1$ of the light guide at the side surface, a gap $H1$ between the bent portion and the other of the clamp portions, and a sum $H$ of the Gap $H1$ and a dimension of inclination of the one of the clamp portions satisfy the conditions: $H1<T1<H$, so that the pair of clamp portions clamp the light guide that is included in the surface light source conversion member.

5. The surface light source device according to claim 1, wherein a gap $H1$ between the bent portion and the other of the clamp portions, a sum $H$ of the $H1$ and a dimension of inclination of the one of the clamp portions, and a total thickness $T$ of the light guide and an optical sheet that is disposed on the bottom surface of the light guide satisfy the conditions: $H1<T<H$, so that the pair of clamp portions clamp the light guide that is included in the surface light source conversion member, and an optical sheet.

6. The surface light source device according to claim 1, wherein the clamp portion that contacts the end corner of the light guide is separated from the side surface of the light guide and the emission surface.

* * * * *